(12) United States Patent  
Tertitski et al.

(10) Patent No.: US 7,904,821 B1  
(45) Date of Patent: Mar. 8, 2011

(54) GRAPHICAL USER INTERFACE THAT IS CONVERTIBLE AT RUNTIME

(75) Inventors: Leonid M. Tertitski, Los Gatos, CA (US); Andrei Ivanov, Mountain View, CA (US)

(73) Assignees: Leonid M. Tertitski, Los Gatos, CA (US); Andrei Ivanov, Mountain View, CA (US)

( * ) Notice: Subject to any disclaimer, the term of this patent is extended or adjusted under 35 U.S.C. 154(b) by 524 days.

(21) Appl. No.: 11/948,693

(22) Filed: Nov. 30, 2007

Related U.S. Application Data

(63) Continuation of application No. 10/707,343, filed on Dec. 5, 2003, now abandoned.

(51) Int. Cl.
G06F 3/00 (2006.01)
G06F 3/048 (2006.01)

(52) U.S. Cl. .......... 715/762; 715/763; 715/764; 715/866

(58) Field of Classification Search .................. 715/762, 715/763, 764, 866
See application file for complete search history.

(56) References Cited

U.S. PATENT DOCUMENTS

| 6,215,488 | B1* | 4/2001 | Bloem et al. .................. 715/762 |
| 6,237,004 | B1* | 5/2001 | Dodson et al. ........................ 1/1 |
| 6,577,319 | B1* | 6/2003 | Kashiwagi et al. ........... 345/581 |
| 7,415,484 | B1* | 8/2008 | Tulkoff et al. ........................ 1/1 |
| 2003/0061482 | A1* | 3/2003 | Emmerichs .................. 713/165 |
| 2003/0067489 | A1* | 4/2003 | Candy Wong et al. ....... 345/765 |
| 2003/0159129 | A1* | 8/2003 | Frank et al. .................. 717/116 |
| 2003/0169293 | A1 | 9/2003 | Savage |
| 2005/0125787 | A1* | 6/2005 | Tertitski et al. ............... 717/162 |
| 2007/0156894 | A1 | 7/2007 | Dees |

* cited by examiner

*Primary Examiner* — Ba Huynh
*Assistant Examiner* — Shashi K Becker

(57) ABSTRACT

An embodiment provides a method to change a graphical user interface in a way that supports runtime modification of an application's GUI without access to the application source code and/or needs no recompilation/restart of the application executable. This method allows the end-user to make runtime modifications of a widget's attributes and/or runtime conversion of widgets into different types of widgets.

19 Claims, 6 Drawing Sheets

```
#include "CUIparam.h"
void main()
{
    CUIChar Param("Test");
    Param = "Hello World";
    while ( Param != "End" )
    {
            Sleep(100);
    }
}
```
Fig. 1
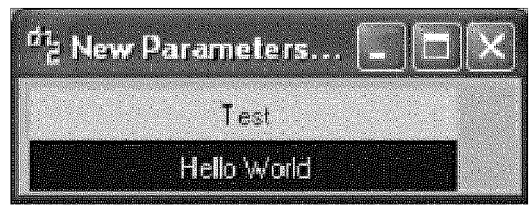
Fig 2
Fig 3

```
#include "CUIparam.h"
void main()
{
        CUIint  FirstNumber("A");
        CUIint SecondNumber("B");
        CUIint SumOfTwoNumbers ("Sum of A and B", CUI_NOT_EDITABLE);
        // Set initial values
        FirstNumber = 1;
        SecondNumber = 2;
        while( !CUISleep(100) )
                SumOfTwoNumbers = FirstNumber + SecondNumber;
}
```

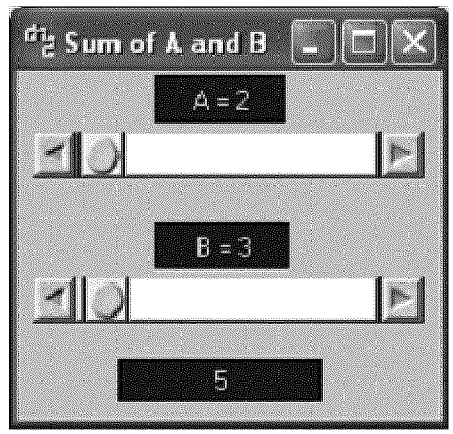

Fig. 9

1. Variable Name: Character string
2. Variable Type, possible values are
    2.1. Integer Value
    2.2. Double Value
    2.3. Character value
    2.4. Array of Integer Values
    2.5. Array of Double values
    2.6. Array of Character Values
3. Actual Value(s)
4. Variable attributes (combination of the following options):
    4.1. It is an editable variable and can be modified by CUI Viewer or can be used only for display by CUI Viewer
    4.2. Callback Type: standalone function or virtual class function
5. Callback address
6. Value Size
7. Number of Values
8. Minimum Value
9. Maximum Value
10. Reference to the Array of possible values (Address of another variable with Variable Type (Field 2) "Array of ...")
11. CUIObject Address

Fig. 10

1. Address of the next CUIObject or NULL
2. Application Index
3. Address of the first child CUIObject
4. Address of this CUIObject owner
5. Address of the previous CUIObject or NULL
6. Horizontal position
7. Vertical position
8. Show mode: Hide, Show
9. Position Alignment
10. X Percent position
11. Y Percent position
12. CUIObject Status: New, Created, Positioned
13. Background Color
14. Font Color
15. Text position alignment
16. Window Style: TOPMOST, NOT TOPMOST
17. CUIObject Type: Dialog Frame, Menu Frame, Child Object
18. CUIObject Action Type: Pulldown menu, Slider
19. Reference to parameter (address of the corresponding CUIParamEntry class)
20. CUIObject Name
21. Show Name
22. Parameter value in text form
23. Model Name
24. CUIObject ID
25. Handle to window
26. Bitmap Address
27. Minimum parameter value
28. Maximum parameter value
29. Increment on button pressed
30. List index value
31. Position Shift Requested
32. Position Shift Applied
33. Font Index
34. Address of the next Same Name CUIObject
35. Address of the previous Same Name CUIObject

Fig. 11

1. Select CUI Widget
2. Convert CUI Widget to...
3. Set CUI Widget attribute values
4. Add CUI Widget after selected CUI Widget
5. Insert CUI Widget inside selected CUI Widget
6. Add CUI Dialog
7. Add CUI Button
8. Add CUI Menu
9. Delete CUI Widget
10. Duplicate CUI Widget
11. Start CUI Record/Play
12. Stop CUI Record/Play

Fig. 12

GRAPHICAL USER INTERFACE THAT IS CONVERTIBLE AT RUNTIME

PRIORITY CLAIM

This application claims the benefit and priority as a Continuation of U.S. application Ser. No. 10/707,343, filed Dec. 5, 2003 now abandoned, the entire contents of which are hereby incorporated by reference as if fully set forth herein.

BACKGROUND OF INVENTION

1. Technical Field

The present invention field of endeavor is user interface management systems (UIMS).

2. Description of Related Art

A Graphical User Interface (GUI) is "the Front End" or "the Face" of any application. Modern, sometimes called "configurable", GUIs allow the end-user to modify some GUI widget attributes: geometrical sizes, position, background color, and text font. Unfortunately, they provide no possibility to change the behavior of the widget associated with some program variable at runtime, or create new link(s) between this variable and new widget(s). For example, it is impossible to convert the widget "editable integer" to the widget "slider" without changing the application source code and/or without compiling a new application executable. A UIMS that would allow the runtime creation of new widget shapes and/or conversion of a widget or a group of widgets to another widget or group of widgets without recompilation and/or restart of the application executable would be desirable.

BRIEF DESCRIPTION OF DRAWINGS

FIG. 1 shows contents of the example program HelloWorld.cpp;

FIG. 2 shows a window with a parameter "Param" when the program HelloWorld.cpp runs for the first time;

FIG. 3 shows a window with a new (converted) representation of parameter "Param";

FIG. 9 shows a window presented by FIG. 8 with parameters converted to sliders;

FIG. 10 provides a list of members of the class CUIParamEntry;

FIG. 11 provides a list of members of the class CUIObject;

FIG. 12 provides a list of CUI Viewer commands currently supported in "Edit" mode.

DETAILED DESCRIPTION

Figures 4, 5:
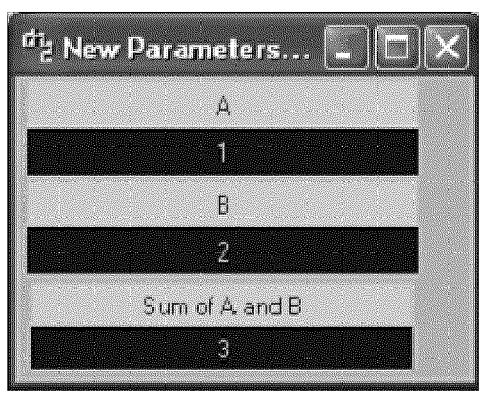
FIG. 4 shows the contents of an example program SumOfTwoNumbers.cpp.
FIG. 5 shows a window with parameters of the program from FIG. 4 when it runs for the first time.

An embodiment provides a set of methods, procedures and functions implemented either in specialized Convertible User Interface (CUI) Dynamic Link Library (CUI DLL) or standalone executable (CUI Viewer), and data representing Convertible User Interface Description (CUI Description).

All variables of any application can be divided into two groups with respect to their relationship with the GUI. Some are associated with some widgets, and thus they are "visible" or perhaps even "changeable" in the GUI, and the others are not. We refer to GUI-"visible" variables as convertible user interface (CUI) variables and we treat them in a special way. First of all, we have implemented a special procedure for their registration, which uses their names and types. This procedure uses a special memory manager (CUI Memory Manager) for their memory allocation. Second, we provide a set of functions for the manipulation of CUI variables.

The registration of CUI variables is done automatically when the application uses special constructors. For manipulation of CUI variables inside of the application (set/get/compare value(s)) we have implemented special methods and operators, which override analogous regular methods and operators used in C++ or Java. In an embodiment, the CUI DLL provides these special constructors, methods and operators. For manipulation of CUI variables outside of the application (registration, visualization in GUI, modification of their values according the user's input) we use the set of methods, procedures and functions implemented in CUI Viewer.

A CUI Description is a text file used to define the application user interface as a set of descriptions of widgets with their respective sizes, locations, graphical and other attributes.

In our design CUI Viewer plays the role of a middleman between the application and its GUI, defined by GUI Description. It is used for the registration of CUI parameters, visualization and modification of the GUI(s) of one or several applications.

During its start an application sends a CUI Description file name and its own name to the CUI Viewer. If the CUI Viewer is able to read the CUI Description file, it converts its contents into a tree of widgets and displays them according their attributes. During its work the application generates each CUI variable by using a corresponding constructor from CUI DLL, and the constructor registers each variable with CUI Viewer. At this moment CUI Viewer attempts to create a link between each registered CUI variable and its corresponding widget. If it is successful, then the widget is updated. If not, CUI Viewer creates some default widget for the new CUI variable. This new widget is added to the chain of widgets and is displayed by CUI Viewer in the window "New Parameters".

Notes:

1. An application never needs the information about the current contents or even existence of the CUI Description file. Generally speaking, the application works even when this file does not exist.

2. If the CUI Description file name provided by application is empty, the CUI Viewer uses the application name to construct some default file name for the CUI Description.

3. All CUI variables of the current application are linked to new widgets, if the CUI Viewer cannot find or open the CUI Description file.

4. The storage of all CUI variables is managed by a CUI Memory Manager. In some implementations the CUI Viewer uses an Application Shared Memory Buffer (ASMB). This design not only simplifies the treatment of the CUI variables but make possible the use of common variables in different applications working with the same CUI Viewer.

5. The CUI Viewer and the CUI DLL do not depend on the purpose of the application. They could be written and/or compiled for any platform once or even become part of operating systems or Internet browsers.

6. All functions and procedures of the CUI Viewer could be easily moved into the CUI DLL. In this case this DLL could be statically linked to any application program.

7. It is very natural to use XML representation for the CUI Description file. However, since today XML is not very well supported on different platforms our program is capable of reading and writing the CUI Description either in XML or in our own internal text format.

When the application is running the user can:

a) change different attributes of any widget: size, position, color etc.

b) move widgets from one window to another;

c) convert any widget to another widget type;

d) construct new and delete old links between GUI variables and widgets;

e) add new widgets not connected to any application variables and which can be used, for example, as a new window or button to open some window;

f) save current widget configuration as the GUI description in the text file that will be used by CUI Viewer during the next start of application.

An example of a simple "Hello World" application is presented by FIG. 1.

For simplicity we suppose that a file "HelloWorld.cpp" was compiled into a "HelloWorld.exe" application. When this application starts running it calls a constructor CUIChar (char *) to initiate the editable CUI variable Param of character string type. This variable is registered with CUI Viewer under the name "Test". Then the application sets the value of Param to string "Hello World". Finally, it waits in a loop until the value of Param becomes equal to the string "End".

When this application starts for the first time (or if Application CUI Description file is not presented), the CUI Viewer displays an editable variable named "Test" having the value "Hello World" by using the default widget designed for CUI Variables of character string type in the default window "New Parameters" (FIG. 2) and waits for user input.

In this example the text "Hello World" is the value of CUI variable Param, which can be modified by user. When user inputs the text "End", the application will end its execution.

Without exiting the application by using the capability provided by CUI Viewer, a user can create a new window "Test Window" and convert the initial default widget previously used for representation of CUI variable Param into a pull-down menu "Hello World" with two options: "Hello World" and "End" (FIG. 3).

If this is done, the application stops its execution when the user selects the option "End" from the described pull-down menu. At this point CUI Viewer asks user to save the new (converted) CUI Description. If the user agrees, CUI Viewer saves the new CUI Description for "HelloWorld.exe" in a text file with the name "HelloWord.CUI". The CUI Viewer will use this file during the next launch of application "HelloWorld.exe" and this application GUI will show up as in FIG. 3.

In this example (FIG. 1) the property of CUI variable Param being editable is defined by the default value of one parameter of constructor CUIChar(char *). The full set of parameters for this constructor will be described later.

Any CUI variable has two mandatory and unchangeable attributes "Name" and "Type", which distinguish it among the other CUI variables. In other words, the CUI Viewer will create only one CUI variable for any given pair (Name, Type) and it will provide read/write access to this variable attributes for any application working under its supervision.

The attribute "Name" is a non-empty character string. Currently CUI DLL and CUI Viewer support the following CUI variable types:

a) CUIint for integers;

b) CUIdouble for doubles;

c) CUIchar for character strings;

d) CUIintArray for arrays of integers;

e) CUIdoubleArray for arrays of doubles;

f) CUIcharArray for arrays of strings.

CUI DLL provides read/write access to the value of any CUI Variable and other manipulation of CUI variables by using a set of overloaded operators defined separately for each type in the corresponding C++ class.

Two CUI Variables defined by one or several applications with the same pair of attributes (Name, Type) always have references to the same address provided by the CUI MemoryManager.

FIG. 4 shows an example of a program for the calculation of the sum of two numbers.

This program defines two user editable CUI variables, FirstNumber and SecondNumber, and a CUI variable SumOfTwoNumbers that can be modified only by the application program. These three variables have the names "A", "B" and "Sum of A and B", respectively. Notice that the application program does not define how and where these variables must be displayed.

The application program sets the initial values and then stays in a while loop and calculates the sum of these two numbers. The function CUISleep( ) belongs to the CUI DLL. It waits for the requested number (100) of milliseconds and then checks the status of the application. If application program state is "End Application", then CUISleep( ) returns 1. The CUI DLL function supporting "set value" function sends the message "Update Value" to the CUI Viewer only if the value of SumOfTwoNumbers was actually changed.

Figure 6:
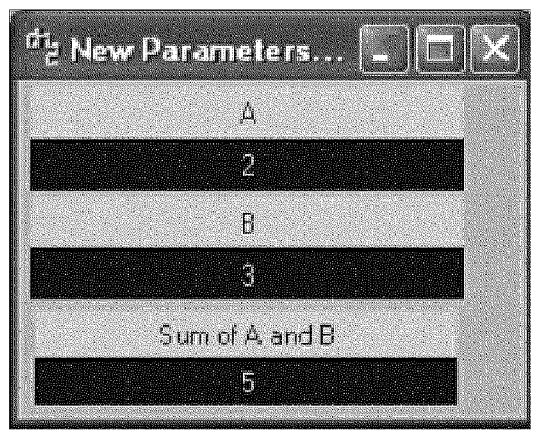
FIG. 6 shows a window from FIG. 5 after the values of parameters have been changed.

When the application starts for the first time (or if file "SumOfTwoNumbers.CUI" is not found) the user is presented with the Initial state of window "New Parameters" (FIG. 5). The user can modify the values of A and/or B and a) the CUI DLL will modify FirstNumber and/or SecondNumber;

b) the application will calculate the result A+B;

c) the CUI Viewer will automatically display new result (FIG. 6)

Let's describe the hypothetical sequence of a user's actions in modifying the GUI of this application when it is running.

Figure 7:
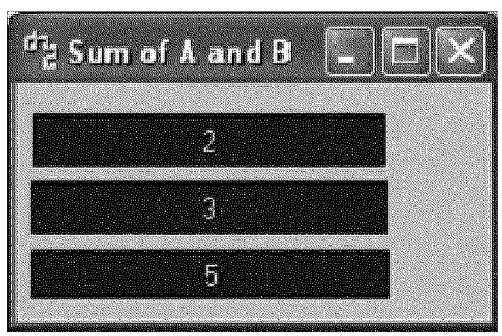
FIG. 7 shows a window with a new (converted) representation of variables of the program presented in FIG. 4.

1. User can create new window "Sum of A and B" and move all widgets representing CUI variables into this window (FIG. 7).

Figure 8:
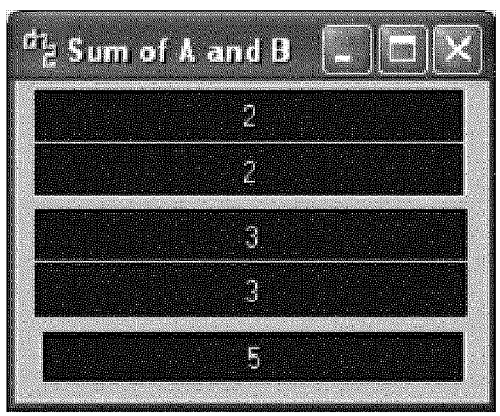
FIG. 8 shows a window presented by FIG. 7 with duplicated parameters.

2. User can duplicate widgets representing the values of A and B (FIG. 8).

3. User can modify size and display style of the first widget representing A (B) and convert the second widget representing the same CUI variable into a slider (FIG. 9).

4. User can test the newly created interface by using sliders to modify the values of editable CUI variables A and/or B.

5. Finally, the user can save the new CUI Description of the newly constructed interface and see it in the next launch of the application.

Let's describe the data structures we are using to make the CUI work. For this we will rather use "functional" descriptions of class members and not their formal names.

We are using three main base classes: CUIParamEntry, CUIParam and CUIObject. The first two of these contain information about CUI variables and methods for their manipulation; the last contains information about widgets.

FIG. 10 shows the information stored by any instance of CUIParamEntry class.

"Actual Value" (FIG. 10 line 3) can be changed either by the CUI or the application. Note that CUI Viewer can change "Actual Value" only if an application defined the associated CUI variable as CUI_EDITABLE and the user changes the corresponding field of the widget linked with the variable.

Each CUI variable is an instance of a type specific class (CUIint, CUIdouble or CUIchar) derived from class CUIParam. Any instance of CUIParam contains only one member "Index of Parameter", which is the index of an instance of class CUIParamEntry previously allocated by CUI MemoryManager.

The constructor of class CUIParam uses one of its input parameters, Name, passed to it by the constructor of one of the derived classes (CUIint, CUIdouble or CUIchar), and a corresponding Type and attempts to find an instance of CUIParamEntry with the same Name and Type in the memory allocated by CUI Memory Manager. In case of a match it makes an Index of Parameter equal to the index of the found instance. Otherwise the new instance of CUIParamEntry with given (Name, Type) is constructed and Index of Parameter stores its index.

All constructors of CUIint, CUIdouble, and CUIchar classes pass additional parameters to the constructor of CUIParam class, which define the initial value of constructed CUI variable and some attributes.

FIG. 11 shows the information stored by any instance of CUIObject class.

We use the following three classes derived from CUIObject to represent different types of widgets: CUIEdit, CUIButton and CUIPicture. Each of these classes contains the full description of the graphical representation and location of corresponding widget.

The operation of any application working in the CUI environment is based on the message exchange between some functions provided by the CUI DLL, the CUI Viewer and the special thread automatically launched for the application. Among these messages, the most important are the "SET_VALUE" and "RUN_CALLBACK" messages. The first of these initializes the changes in the visualization of CUI Variables on the screen, and the other initializes some reactions of the application related to the user's input.

Every time the value of any CUI Variable (CUI_Var) is changed, a special CUI DLL function sends a "SET_VALUE" message with the address of corresponding instance of the CUIParamEntry class to CUI Viewer. Upon receiving this message the CUI Viewer performs the following sequence of operations:

a) It checks the value of the field "CUIObject Address" (FIG. 10 line 11). If it is NULL, the CUI Viewer searches for an instance of CUIObject class with the same Name (FIG. 10 line 1) and Type (FIG. 10 line 2) in the tree of CUIObjects. If no such instance is found, the CUI Viewer creates a new instance of CUIObject class with the default parameters for the visualization of CUI_Var and address of the CUIParamEntry instance stored in "Reference to parameter" field (FIG. 11 line 19). The address of the newly created or found instance is stored in the field "CUIObject Address" (FIG. 10 line 11).

b) It displays the new value of the CUI_Var by using the virtual function Draw( ) for the instance of the CUIObject linked with the CUI_Var.

Notes:

1) When the search of CUIObject instance for current Name (FIG. 10 line 1) and Type (FIG. 10 line 2) is unsuccessful, the default parameters for visualization of the CUI_Var by the newly constructed CUIObject instance make possible the visualization of the CUI_Var in the special window "New Parameters".

2) Any CUI Variable can have more than one representation in the GUI described by different CUIObject instances. All these instances comprise a doubly linked list (FIG. 11 lines 34, 35) used by the CUI Viewer when it processes the "SET_VALUE" message.

When the application calls any CUI function for the first time, the CUI Viewer starts a special thread CUTAppThread used for waiting and processing of "RUN_CALLBACK" messages. The CUI Viewer sends such a message every time the value of the CUI Variable CUI_Var is modified by user's interaction with the GUI (or by another program) and the field "Callback address" (FIG. 10 line 5) of the CUIParamEntry instance associated with the CUI_Var contains a non-NULL address of some callback routine of the application.

In the special "Edit" mode the CUI Viewer allows the user to convert any widget into a widget of another type or change its attributes. The "Edit" mode can be selected by pressing "Ctrl-E" ("Ctrl"+"E" buttons simultaneously). When this is done the user should:

a) select the widget to convert or modify by making a right mouse button click inside this widget;

b) open the CUI Viewer pull down menu "Convert To . . . " and select the new widget type by pressing a button inside the desired widget type image.

FIG. 12 shows the full list of CUI Viewer commands currently supported in "Edit" mode.

Notes:

1) the CUI Viewer itself is written as a CUI application; therefore the user can add or modify the list of widgets in the "Convert To" menu.

2) the CUI Viewer does not send any messages regarding the widget conversion to the application program, and the application continues its execution as usual.

The user can record input information to file and then play this file by using CUI Viewer commands "Record" and "Play" (FIG. 12, lines 11 and 12). In "Record" mode CUI Viewer stores only information about CUI Variables changes. Each record contains following information:

1. Variable Name;
2. Variable Value;
3. Time when user changed Variable Value.

The CUI Viewer "Play" command can be used even if the positions, sizes or types of any Widgets have been changed (claim 12). During Play the CUI Viewer reads these records and simulates execution (moves mouse pointer to widget with the same Variable Name as in the record and changes Variable Value) according to the recorded time.

If there is more than one widget with the same name, the CUI Viewer calculates the "Time To Set Value" for each such widget. The "Time To Set Value" is calculated as the time needed to move the mouse cursor at "Mouse Simulation Speed" to the closest point of the widget plus the time for "Value Simulation Change". If the widget is not visible (for example, it is located in a closed window), the "Time To Set Value" is equal to the time needed to move mouse cursor and make this widget visible plus time needed for "Value Simulation Change". The widget with minimum "Time To Set Value" is used.

In the current implementation the default value of "Mouse Simulation Speed" is equal to 5 centimeters per second, "Time To Set Value" is equal to number of the Mouse/Keyboard button clicks multiplied by 0.3 seconds per click.

Some methods of the disclosure herein are based on or intensively use the external and internal representation of different CUI data in XML format. All these XML-methods can be described as "static" or "dynamic" according to their usage of transformation of XML representations involved in the corresponding processes.

The static XML-methods use XML representation for storage and reading/writing procedures of CUI Description and widget library. They use no transformations of XML data.

Every dynamic method uses some XSL transformation to convert the initial XML representation of some part of the CUI data into its new XML representation. When the transformation is complete the CUI Viewer uses this new XML representation for visualization of the same CUI data in some other (converted) way. This approach is implemented for automatic recalculation of coordinates and sizes of widgets and for automatic rule based conversion of attributes of replaced widgets.

Notes:

1) The XSL files used for our dynamic XML-methods are the external text files that form the special Transformation Library. Any of these files can be modified or replaced by a new XSL files, which can provide new rules for some transformation.

2) The use of a special naming convention for XSL files of Transformation Library makes it possible to support pre-defined lists for widget conversion.

3) The use of this naming convention makes the Transformation Library expandable. There is a possibility not only to replace some or all of the XSL files, but also to add new XSL files providing conversion rules for a new customer's widgets.

4) The names of CUI Variables can be used in XSL transformation files names.

5) While processing an XSL file, a special function from CUI DLL has access to the current value of any CUI Variable registered with CUI Viewer. This makes it possible to use not only the names of CUI Variables but also their values during XSL transformation.

What is claimed is:

1. A computer-implemented method, comprising:
receiving from an application program a call to a method to initiate a variable;
creating and storing a link of the variable to first data describing a first widget of a graphical user interface;
based on the first data, displaying, on a computer display, a value of the variable using the first widget in the graphical user interface;
receiving user input specifying a conversion of the first widget to a second widget having a second widget type that is different than a first widget type of the first widget;
without deleting the link, converting the first widget to the second widget by changing the first data to second data describing the second widget having the second widget type that is different from the first widget type of the first widget;
based on the second data, displaying the second widget in the graphical user interface in place of the first widget, and displaying the value of the variable using the second widget in the graphical user interface;
wherein the method is performed using one or more processors.

2. The method of claim 1, wherein the first data comprises a first extensible markup language (XML) representation of the variable and the first widget, wherein the second data comprises a second XML representation of the variable and the second widget, and wherein the changing comprises transforming the first XML representation into the second XML representation using an extensible stylesheet language (XSL) transformation (XSLT).

3. The method of claim 1, wherein the receiving, changing and displaying are performed without sending any messages to the application program.

4. The method of claim 1, wherein the call comprises a data type of the variable, and wherein the first widget comprises a default widget that is associated with the data type of the variable.

5. The method of claim 1, further comprising:
receiving second user input specifying adding a new button to the first widget;
changing the first data to the second data by including new data describing the new button;
displaying the second widget in the graphical user interface in place of the first widget and including the new button.

6. The method of claim of claim 1, further comprising:
receiving second user input specifying adding a new attribute value for the first widget;
changing the first data to the second data by including new data describing the new attribute value;
displaying the second widget in the graphical user interface in place of the first widget and including a new attribute based on the new attribute value.

7. The method of claim 1, wherein the first widget is a text box displaying an integer value and the second widget is a slider.

8. The method of claim 1, further comprising:
receiving second user input specifying recording information about changes to the value of the variable;
storing information identifying the variable, the value, and a first time at which the value was changed;
receiving third user input specifying replaying the recorded information at a second time;
simulating execution of movements of a pointer in the display using the recorded information to result in changing the variable to the value at the second time.

9. The method of claim 8, wherein the receiving the third user input and the simulating are performed when a state of the graphical user interface is different at the second time than at the first time.

10. The method of claim 1, further comprising automatically recalculating one or more display coordinates and sizes for the second widget as part of the changing and displaying.

11. The method of claim 10, wherein the XSLT defines one or more rules for conversion of attributes of the first widget.

12. The method of claim 10, further comprising receiving a new XSLT during a run time of the application program and replacing the XSLT with the new XSLT during the run time, wherein the new XSLT defines one or more new rules for conversion of attributes of the first widget.

13. The method of claim 1, further comprising:
at a run time of the application program:
receiving third data describing a new third widget;
receiving second user input specifying converting the first widget to the third widget;
changing the link to result in linking the variable to the third data;
displaying the third widget in the graphical user interface in place of the first widget.

14. A computer-implemented method, comprising:
receiving from an application program a call to a constructor method to initiate a variable;
creating and storing a link of the variable to first XML data describing a first widget of a graphical user interface;
based on the first XML data, displaying, on a computer display, a value of the variable using the first widget in the graphical user interface;

receiving user input specifying a conversion of the first widget to a second widget having a second widget type that is different than a first widget type of the first widget;

without deleting the link, converting the first widget to the second widget by changing the first XML data to second XML data describing the second widget having the second widget type that is different from the first widget type of the first widget, using an extensible stylesheet language transformation (XSLT) that receives the first XML data as input and generates the second XML data as output;

based on the second XML data, displaying the second widget in the graphical user interface in place of the first widget, and displaying the value of the variable using the second widget in the graphical user interface;

wherein the receiving, creating, changing and displaying are performed without sending any messages to the application program;

wherein the method is performed by one or more processors.

15. The method of claim 14, further comprising:
at a run time of the application program:
receiving third XML data describing a new third widget;
receiving second user input specifying converting the first widget to the third widget;
changing the link to result in linking the variable to the third XML data;
displaying the third widget in the graphical user interface in place of the first widget.

16. The method of claim 14, further comprising:
receiving second user input specifying adding a new button to the first widget;
changing the first XML data to the second XML data by including new data describing the new button;
displaying the second widget in the graphical user interface in place of the first widget and including the new button.

17. A computer program product comprising recorded sequences of instructions which when executed by one or more processors cause the one or more processors to perform:
receiving from an application program a call to a method to initiate a variable;
creating and storing a link of the variable to first data describing a first widget of a graphical user interface;
based on the first data, displaying, on a computer display, a value of the variable using the first widget in the graphical user interface;
receiving user input specifying a conversion of the first widget to a second widget having a second widget type that is different than a first widget type of the first widget;
without deleting the link, converting the first widget to the second widget by changing the first data to second data describing the second widget having the second widget type that is different from the first widget type of the first widget;
based on the second data, displaying the second widget in the graphical user interface in place of the first widget, and displaying the value of the variable using the second widget in the graphical user interface.

18. The computer program product of claim 17, wherein the first data comprises a first extensible markup language (XML) representation of the variable and the first widget, wherein the second data comprises a second XML representation of the variable and the second widget, and wherein the changing comprises transforming the first XML representation into the second XML representation using an extensible stylesheet language (XSL) transformation (XSLT).

19. The computer program product of claim 17, wherein the receiving, changing and displaying are performed without sending any messages to the application program.

* * * * *